United States Patent
Verner et al.

(10) Patent No.: US 8,516,895 B2
(45) Date of Patent: Aug. 27, 2013

(54) IN-CYLINDER PRESSURE SENSOR DIAGNOSTIC SYSTEMS AND METHODS

(75) Inventors: Douglas R. Verner, Sterling Heights, MI (US); Kenneth J. Buslepp, Brighton, MI (US); Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 905 days.

(21) Appl. No.: 12/575,694

(22) Filed: Oct. 8, 2009

(65) Prior Publication Data

US 2011/0083498 A1    Apr. 14, 2011

(51) Int. Cl.
*G01L 7/16* (2006.01)

(52) U.S. Cl.
USPC .............................................. 73/744; 73/721

(58) Field of Classification Search
USPC .......................... 73/721, 727, 744
See application file for complete search history.

(56) References Cited

U.S. PATENT DOCUMENTS

| | | | | |
|---|---|---|---|---|
| 3,866,166 | A * | 2/1975 | Kerscher et al. | 340/462 |
| 4,074,576 | A * | 2/1978 | Bryzzhev et al. | 73/702 |
| 4,311,053 | A * | 1/1982 | Cucci | 73/704 |
| 7,331,223 | B2 * | 2/2008 | Zazovsky | 73/152.51 |
| 7,479,391 | B2 * | 1/2009 | Bjornson et al. | 436/54 |
| 7,533,563 | B2 * | 5/2009 | Horak | 73/114.45 |
| 7,543,501 | B2 * | 6/2009 | Cottles et al. | 73/715 |
| 7,798,005 | B2 * | 9/2010 | Leverrier et al. | 73/702 |
| 7,920,058 | B2 * | 4/2011 | Bennie et al. | 340/480 |

FOREIGN PATENT DOCUMENTS

CN    101166960    4/2008

* cited by examiner

*Primary Examiner* — Max Noori

(57) ABSTRACT

A pressure sensor diagnostic system of the present disclosure includes an excitation module, a frequency determination module, and a fault determination module. The excitation module excites an in-cylinder pressure sensor and causes the in-cylinder pressure sensor to oscillate. The frequency determination module determines an oscillation frequency of the in-cylinder pressure sensor. The fault determination module diagnoses the in-cylinder pressure sensor based on the oscillation frequency.

13 Claims, 3 Drawing Sheets

IN-CYLINDER PRESSURE SENSOR DIAGNOSTIC SYSTEMS AND METHODS

FIELD

The present disclosure relates to internal combustion engines, and more particularly to diagnostic systems for in-cylinder pressure sensors.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

An internal combustion engine may include an in-cylinder pressure sensor in each cylinder of the engine to detect in-cylinder pressure. An engine controller may control fuel injection pulses based on the in-cylinder pressure for improved fuel combustion and reduced fuel consumption. The in-cylinder pressure sensor is exposed to high temperature and high pressure of the cylinder and may be contaminated by the fuel in the cylinder.

SUMMARY

A pressure sensor diagnostic system of the present disclosure includes an excitation module, a frequency determination module, and a fault determination module. The excitation module excites an in-cylinder pressure sensor and causes the in-cylinder pressure sensor to oscillate. The frequency determination module determines an oscillation frequency of the in-cylinder pressure sensor. The fault determination module diagnoses the in-cylinder pressure sensor based on the oscillation frequency.

A method of diagnosing an in-cylinder pressure sensor includes: exciting an in-cylinder pressure sensor to cause the in-cylinder pressure sensor to oscillate; determining an oscillation frequency of the in-cylinder pressure sensor; and diagnosing a fault in the in-cylinder pressure sensor based on the oscillation frequency.

In one feature, the fault determination module diagnoses a fault in the in-cylinder pressure sensor when the oscillation frequency of the in-cylinder pressure sensor is outside a predetermined range.

In other features, the in-cylinder pressure sensor includes a measurement rod and a piezoelectric element that is coupled to the measurement rod. The excitation module applies a voltage pulse to the piezoelectric element to excite the measurement rod, causing the measurement rod to oscillate. The oscillation frequency is determined based on mass and stiffness of the measurement rod. The excitation module excites the in-cylinder pressure sensor after an ignition switch is turned on and before an engine is started.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
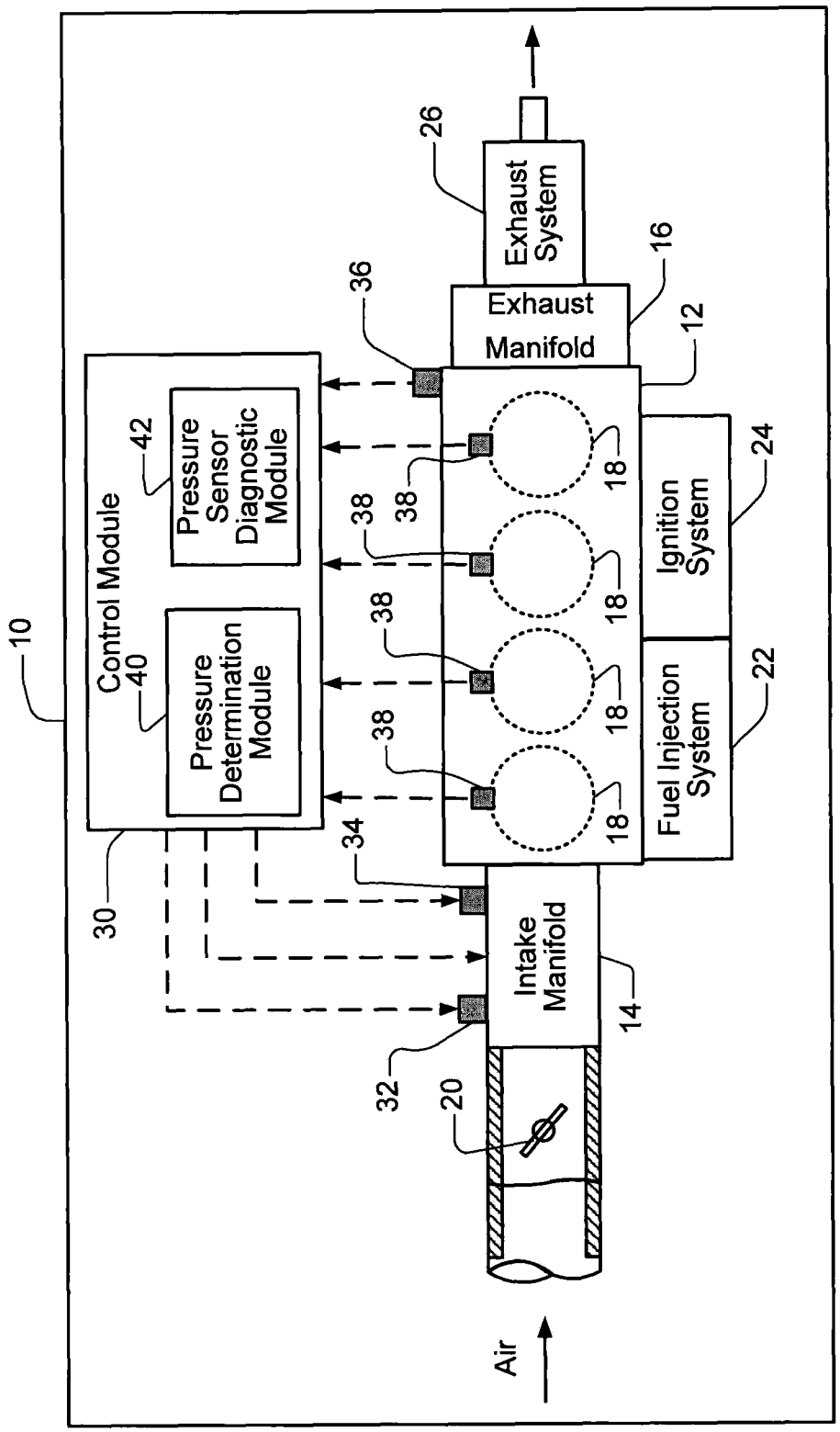
FIG. 1 is a block diagram of an engine system in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A pressure sensor diagnostic system and method of the present disclosure diagnoses an in-cylinder pressure sensor by causing the in-cylinder pressure sensor to oscillate at a natural frequency. The pressure sensor diagnostic system and method diagnoses a fault in the in-cylinder pressure sensor when the natural frequency is outside a predetermined range.

Referring to FIG. 1, an engine system 10 includes an engine 12, an intake manifold 14, and an exhaust manifold 16. The engine 12 may be a diesel engine or a gasoline engine and includes a plurality of cylinders 18. While four cylinders 18 are shown, the engine 12 may include any number of cylinders 18, including but not limited to 2, 5, 6, 8, 10 and 12. Air may be drawn through a throttle 20 into the intake manifold 14 that distributes air to the cylinders 18. Fuel may be injected into the cylinders 18 by a fuel injection system 22 to generate an air/fuel mixture in the cylinders 18. An ignition system 24 may ignite the air/fuel mixture using a spark plug (not shown) to cause combustion of the air/fuel mixture in the cylinders 18. Combustion of the air/fuel mixture generates combustion force to drive pistons (not shown) that rotatably drive a crankshaft (not shown). The exhaust gas exits from the cylinders 18 through the exhaust manifold 16 to an exhaust system 26 and is released to atmosphere.

A control module 30 communicates with a plurality of sensors and controls the engine operations based on signals from the plurality of sensors. The plurality of sensors include, but are not limited to, a manifold air pressure (MAP) sensor 32, a mass air flow (MAF) sensor 34, an engine speed sensor 36, and a plurality of in-cylinder pressure sensors 38. The MAP sensor 32 measures the MAP. The MAF sensor 34 measures the MAF into the intake manifold 14. The engine speed sensor 36 measures engine speed (RPM). The in-cylinder pressure sensors 38 measure in-cylinder pressure in the associated cylinders 18. The control module 30 may include a pressure determination module 40 and a pressure sensor diagnostic module 42 that communicate with the in-cylinder pressure sensors 38. The pressure determination module 40 determines in-cylinder pressure based on signals from the in-cylinder pressure sensors 38. The pressure sensor diagnostic module 42 diagnoses the in-cylinder pressure sensors 38 based on signals from the in-cylinder pressure sensors 38.

Figure 2:
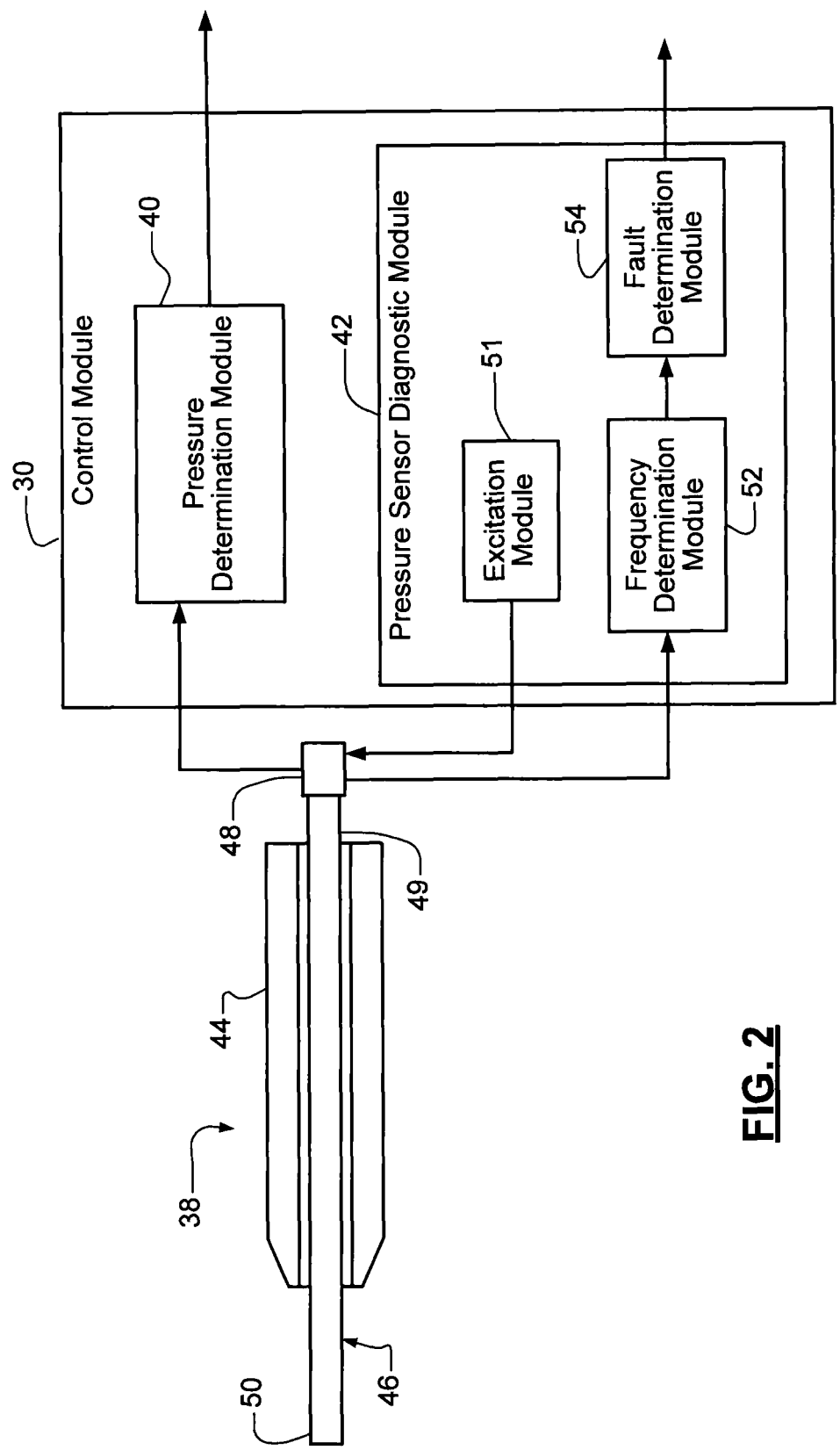
FIG. 2 is a block diagram of an in-cylinder pressure sensor and a pressure sensor diagnostic module in accordance with the teachings of the present disclosure.

Referring to FIG. 2, the in-cylinder pressure sensor 38 includes a housing 44, a measurement rod 46, and a piezoelectric element 48. A first end 49 of the measurement rod 46 is connected to the piezoelectric element 48. A second end 50 of the measurement rod 46 extends into the associated cylinder 18 and is exposed to in-cylinder pressure.

The piezoelectric element 48 is made of a piezoelectric material that generates an electric potential (i.e., voltage) in response to applied mechanical stress (or compressive force) or vice versa. When a piston compresses air or air/fuel mixture inside the cylinder 18, the measurement rod 46 is subjected to in-cylinder pressure. The in-cylinder pressure results in compressive force or mechanical stress in the piezoelectric element 48, thereby generating voltage across the piezoelectric element 48. The pressure determination module 40 determines the in-cylinder pressure based on voltage pulse signals from the in-cylinder pressure sensor 38, particularly from the piezoelectric element 48.

The pressure sensor diagnostic module 42 includes an excitation module 51, a frequency determination module 52, and a fault determination module 54. The pressure sensor diagnostic module 42 communicates with and diagnoses the in-cylinder pressure sensor 38 based on frequency signals from the in-cylinder pressure sensor 38.

The excitation module 51 excites the in-cylinder pressure sensor 38 to cause oscillation of the in-cylinder pressure sensor 38, particularly the measurement rod 46. For example, the excitation module 51 may be activated to apply a voltage pulse across the piezoelectric element 48 when an ignition switch is turned on. The voltage pulse results in compressive force or mechanical stress in the piezoelectric element 48. The measurement rod 46 is connected to the piezoelectric element 48. Therefore, the mechanical stress in the piezoelectric element 48 causes oscillation or vibration of the measurement rod 46 at an oscillation frequency (i.e., natural frequency). The oscillation or vibration of the measurement rod 46 may occur along a longitudinal direction or a transverse direction of the measurement rod 46 depending on a direction of the applied voltage. For example, when the voltage is applied in a transverse direction of the measurement rod 46, the measurement rod 46 oscillates along the transverse direction.

It is understood and appreciated that the excitation module 51 may cause oscillation of the measurement rod 46 by a method other than applying voltage pulses to the piezoelectric element 48. For example, the excitation module 51 may apply a force directly to the measurement rod 46 to cause oscillation of the measurement rod 46.

Generally, the diagnosis is performed after an ignition switch is turned on and before the engine 12 is started. After the engine 12 is started, in-cylinder pressure is generated in the cylinders 18 and may interfere with measurement of the natural frequency. To ensure accurate measurement of the natural frequency, the excitation module 51 excites the measurement rod 46 after the ignition switch is activated and before the engine 12 is started.

When the measurement rod 46 oscillates, alternate tensile stress and compressive stress are generated in the piezoelectric element 48 at a regular interval that corresponds to a natural frequency of the measurement rod 46. When the compressive stress is generated, voltage is generated across the piezoelectric element 48 at the regular interval, thereby generating voltage pulses. The frequency determination module 52 records the voltage pulses transmitted from the piezoelectric element 48 and determines the frequency of the voltage pulses. The frequency of the voltage pulses corresponds to the natural frequency of the measurement rod 46. The fault determination module 54 compares the measured natural frequency with a predetermined range of natural frequency. When the measured natural frequency is outside the predetermined range of natural frequency, the fault determination module 54 diagnoses a fault in the in-cylinder pressure sensor 38.

Generally, an object may oscillate or vibrate at a natural frequency upon application of force. The natural frequency of an object may be determined based on a natural frequency equation as follows:

$$f_n = (1/2\pi)(\kappa/M)^{1/2}$$

wherein $f_n$=natural frequency in hertz (1/seconds)
   $\kappa$=stiffness of an object
   M=mass of an object.

Natural frequency depends on stiffness and mass of the object that oscillates. When the measurement rod 46 oscillates, the measurement rod 46 oscillates at a natural frequency that satisfies the natural frequency equation. For a given stiffness and mass of the measurement rod 46, the natural frequency should remain constant throughout the life of the in-cylinder pressure sensor 38. However, the measurement rod 46 is exposed to a high-heat and high-pressure environment and may be contaminated by fuel in the cylinder 18. When the measurement rod 46 is contaminated or degraded, the mass and stiffness of the measurement rod 46 are changed.

For example, when contaminants, such as dirt or fuel, adhere to the measurement rod 46, the mass of the measurement rod 46 is increased and, consequently, a frequency decay may be observed. Therefore, the natural frequency of the measurement rod 46 gives an indication of whether contaminants have accumulated on the measurement rod 46 to a degree that the measurement rod 46 can no longer accurately measure the in-cylinder pressure.

Figure 3:
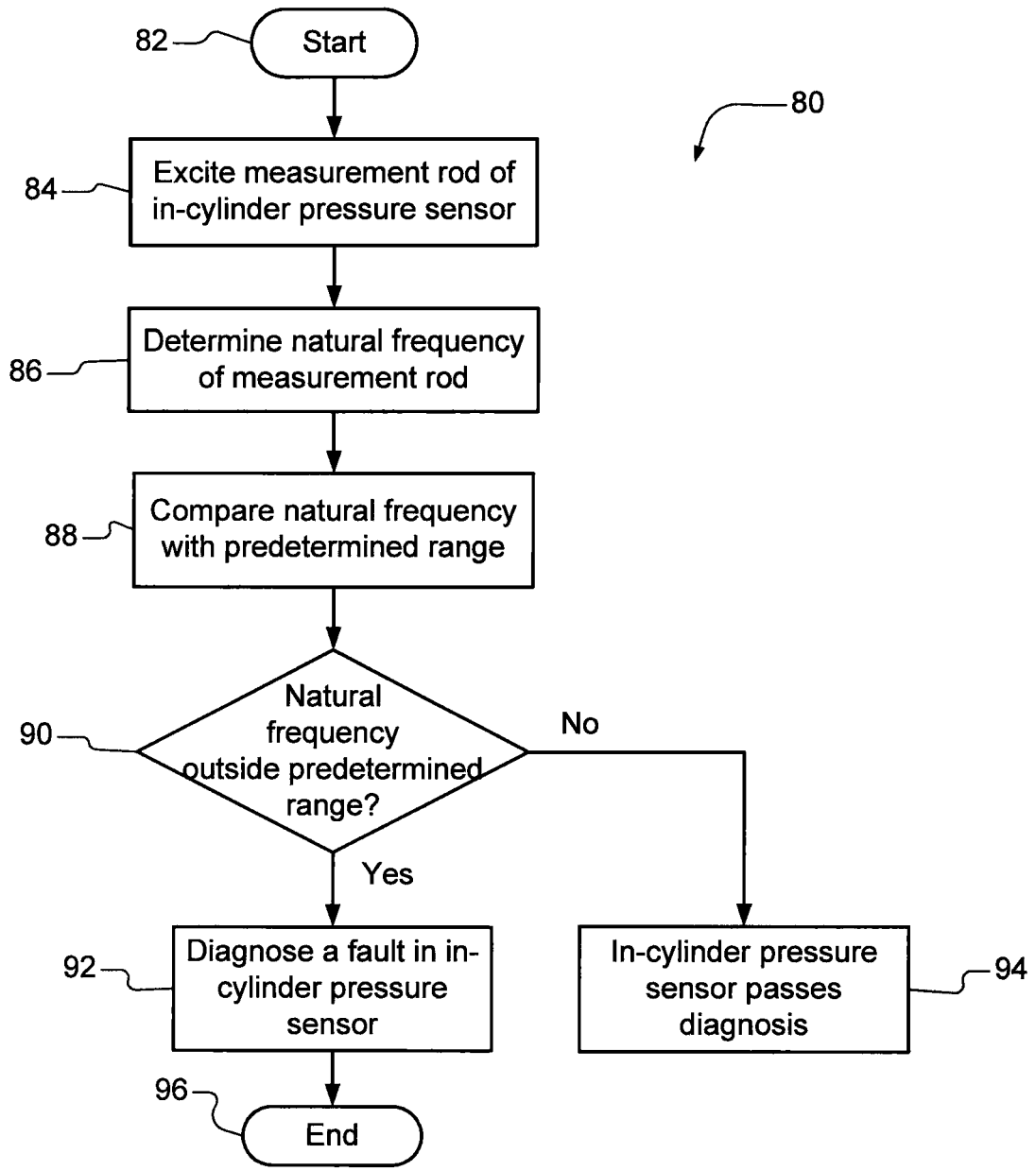
FIG. 3 is a flow diagram of a method of diagnosing an in-cylinder pressure sensor in accordance with the teachings of the present disclosure.

Referring to FIG. 3, a method 80 of diagnosing an in-cylinder pressure sensor starts in step 82. The excitation module 51 excites the measurement rod of the in-cylinder pressure sensor 38 in step 84. The frequency determination module 52 determines a natural frequency of the measurement rod 46 in step 86. The fault determination module 54 compares the measured natural frequency with a predetermined range in step 88. When the natural frequency is outside the predetermined range in step 90, the fault determination module 54 diagnoses a fault in the in-cylinder pressure sensor 54 in step 94. When the natural frequency is within the predetermined range in step 90, the in-cylinder pressure sensor 38 passes the diagnosis in step 94. The method 80 ends in step 96.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A pressure sensor diagnostic system comprising:
   an excitation module that excites a pressure sensor and that causes the pressure sensor to oscillate;
   a frequency determination module that determines an oscillation frequency of the pressure sensor; and
   a fault determination module that diagnoses a fault in the pressure sensor based on the oscillation frequency, wherein the pressure sensor includes a measurement rod and a piezoelectric element that is coupled to the measurement rod.

2. The pressure sensor diagnostic system of claim 1 wherein the fault determination module diagnoses a fault in the pressure sensor when the oscillation frequency of the pressure sensor is outside a predetermined range.

3. The pressure sensor diagnostic system of claim 1 wherein the excitation module excites the measurement rod and causes the measurement rod to oscillate.

4. The pressure sensor diagnostic system of claim 1 wherein the excitation module applies a voltage pulse to the piezoelectric element.

5. The pressure sensor diagnostic system of claim 1 wherein the oscillation frequency is determined based on mass and stiffness of the measurement rod.

6. A pressure sensor diagnostic system comprising:
an excitation module that excites a pressure sensor in a cylinder of an engine and that causes the pressure sensor to oscillate;
a frequency determination module that determines an oscillation frequency of the pressure sensor; and
a fault determination module that diagnoses a fault in the pressure sensor based on the oscillation frequency, wherein the excitation module excites the pressure sensor after an ignition switch is turned on and before the engine is started.

7. A method of diagnosing a pressure sensor comprising:
exciting the pressure sensor to cause the pressure sensor to oscillate;
determining an oscillation frequency of the pressure sensor; and
diagnosing a fault in the pressure sensor based on the oscillation frequency, wherein the pressure sensor includes a measurement rod and wherein the oscillation frequency of the pressure sensor is a natural frequency of the measurement rod.

8. The method of claim 7 further comprising diagnosing a fault in the pressure sensor when the oscillation frequency is outside a predetermined range.

9. The method of claim 7 further comprising oscillating the measurement rod.

10. The method of claim 7 wherein the pressure sensor further includes a piezoelectric element that is coupled to the measurement rod.

11. The method of claim 10 further comprising applying a voltage pulse to the piezoelectric element to cause oscillation of the measurement rod.

12. The method of claim 7 wherein the natural frequency is determined based on mass and stiffness of the measurement rod.

13. A method comprising:
exciting a pressure sensor in a cylinder of an engine to cause the pressure sensor to oscillate;
determining an oscillation frequency of the pressure sensor;
diagnosing a fault in the pressure sensor based on the oscillation frequency; and
exciting the pressure sensor after an ignition switch is activated and before the engine is started.

* * * * *